United States Patent
Johnson (10) Patent No.: US 9,667,025 B2
(45) Date of Patent: May 30, 2017

(54) SYSTEM AND METHOD FOR INCREASING POWER EMITTED FROM A FIBER LASER

(71) Applicant: BAE SYSTEMS INFORMATION AND ELECTRONIC SYSTEMS INTEGRATION INC., Nashua, NH (US)

(72) Inventor: Benjamin R. Johnson, Nottingham, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 15/090,118

(22) Filed: Apr. 4, 2016

(65) Prior Publication Data

US 2016/0294150 A1 Oct. 6, 2016

Related U.S. Application Data

(60) Provisional application No. 62/143,432, filed on Apr. 6, 2015.

(51) Int. Cl.
*H01S 3/06* (2006.01)
*H01S 3/067* (2006.01)
(Continued)

(52) U.S. Cl.
CPC .......... *H01S 3/0675* (2013.01); *G02B 6/00* (2013.01); *H01S 3/0401* (2013.01);
(Continued)

(58) Field of Classification Search
CPC .... H01S 3/0675; H01S 3/0401; H01S 3/1053; H01S 3/0405; H01S 3/06704; H01S 3/094003; H01S 3/09415; G02B 6/00
See application file for complete search history.

(56) References Cited

U.S. PATENT DOCUMENTS

| | | | |
|---|---|---|---|
| 2007/0064756 A1* | 3/2007 | Kashyap | G02F 1/0147 372/43.01 |
| 2013/0136146 A1* | 5/2013 | Creeden | G02B 6/0218 372/6 |

OTHER PUBLICATIONS

H. Zhang, D.Y. Tang, X. Wu, and L.M. Zhao, "Multi-Wavelength Dissipative Soliton Operation of an Erbium-Doped Fiber Laser." Jul. 20, 2009 / vol. 17, No. 15 / Optics Express 12692.

* cited by examiner

*Primary Examiner* — Armando Rodriguez
(74) *Attorney, Agent, or Firm* — Sand & Sebolt, LPA (57) ABSTRACT

A fiber laser having a thermal controller operatively connected to one or more fiber Bragg gratings is provided. The thermal controller does not impart much or imparts very little mechanical stress or strain to the optical fiber in which the FBGs reside because such forces can alter the FBG performance. Rather, the thermal controller utilizes a thermally conductive semi-solid or non-Newtonian fluid to submerge/suspend a portion of the optical fiber in which FBG resides. Temperature control logic controls whether a thermoelectric heater and cooler should be directed to increase or decrease its temperature. The thermoelectric heater and cooler imparts or removes thermal energy from the FBG to efficiently control its performance without the application of mechanical stress. The fiber laser having a thermal controller generally is able to increase laser output power greater than two times the amount of output power of a similarly fabricated fiber laser free of the thermal controller(s).

19 Claims, 8 Drawing Sheets

(51) Int. Cl.
 *G02B 6/00* (2006.01)
 *H01S 3/105* (2006.01)
 *H01S 3/04* (2006.01)
 *H01S 3/094* (2006.01)
 *H01S 3/0941* (2006.01)
(52) U.S. Cl.
 CPC .......... *H01S 3/1053* (2013.01); *H01S 3/0405* (2013.01); *H01S 3/06704* (2013.01); *H01S 3/09415* (2013.01); *H01S 3/094003* (2013.01)

SYSTEM AND METHOD FOR INCREASING POWER EMITTED FROM A FIBER LASER

CROSS-REFERENCE TO RELATED APPLICATION

This application claims the benefit of prior filed U.S. Provisional Application Ser. No. 62/143,432 file on Apr. 6, 2015; the entirety of which is hereby incorporated by reference as if fully rewritten.

BACKGROUND

Technical Field

The present disclosure relates generally to fiber lasers. More particularly, the present disclosure relates to more efficient fiber lasers. Specifically, the present disclosure relates to fiber lasers having thermal controller operatively connected to the fiber Bragg gratings to control their temperature without imparting mechanical stress or strain which would alter the fiber Bragg grating performance.

Background Information

Fiber lasers are lasers with optical fibers as the gain media. In most instances, the gain media is an optical fiber doped with rare earth ions such as erbium ($Er^{3+}$), neodymium ($Nd^{3+}$), ytterbium ($Yb^{3+}$), thulium ($Tm^{3+}$), or praseodymium ($Pr^{3+}$), and one or several fiber-coupled laser diodes are used for pumping. Therefore, most fiber lasers are diode-pumped lasers. Although the gain media of fiber lasers are similar to those of solid-state bulk lasers, the wave guiding effect and the small effective mode area usually lead to substantially different properties of the lasers. For example, they often operate with much higher laser gain and resonator losses.

In order to form a laser resonator with the optical fibers, one either needs a reflector (mirror) to form a linear resonator, or one builds a fiber ring laser. Various types of mirrors may be utilized used in linear fiber laser resonators.

For example, one type of mirror utilized to form a laser resonator in simple laboratory setups are ordinary dielectric mirrors butted perpendicularly to the cleaved fiber ends. This approach, however, is not very practical for mass fabrication and not very durable either. Another example of a type of mirror utilized to form a laser resonator is a dielectric coating(s) deposited directly on fiber ends. These dielectric coatings produce a wide range of reflective wavelengths. But again, these can be impractical.

Another example of mirrors/reflectors utilized to form a laser resonator is Fiber Bragg Gratings (FBG). The FGBs may be formed either (i) directly in the doped fiber, or (ii) in an undoped fiber which is spliced to the active (i.e. doped) fiber.

Fiber lasers utilizing FBGs can be constructed to operate on a single longitudinal mode (i.e., single-frequency lasers, single-mode operation) with a very narrow linewidth of a few kilohertz or even below 1 kHz. Current FBG-based fiber lasers achieve long-term stable single-frequency operation without excessive requirements concerning temperature stability. In doing so, the laser resonator relatively is kept relatively short (e.g. of the order of 5 cm), even though a longer resonator may allow for even lower phase noise and a correspondingly smaller linewidth. The fiber ends have narrow-bandwidth FBGs (i.e., distributed Bragg reflector lasers (DBR), DBR fiber lasers), selecting a single resonator mode. Typical output powers are a few milliwatts to some tens of milliwatts, although single-frequency fiber lasers with up to roughly 1 W output power have also been demonstrated.

Ordinarily, a need exists to increase the power emitted from fiber lasers without incurring excess design or component costs. In general, power emitted may be increased by increasing the power applied to a laser, optically or electrically. This works until the laser reaches a fundamental, physical limitation that, when exceeded, induces catastrophic laser damage. After this limitation is reached, a laser must be redesigned to compensate for this limitation. This is often costly.

The majority of existing devices in the art incorporate passive methods of stabilization and compensation of the fiber/waveguide/grating for environmental changes about the device. Additionally, other fiber laser devices compensate thermal perturbations by mechanically straining the fiber for compensation. However, this is disastrous in high power fiber lasers. Applying compressive or tensile strain to a fiber component in a high-power fiber laser will result in catastrophic failure or at a minimum significant sacrifice in device lifetime.

SUMMARY

Issues continue to exists with FBG-based fiber lasers in that it is desirable to efficiently maximize power. The present disclosure addresses the need for the increasing demand for higher power, higher brightness, and more efficient and lower cost lasers. The present disclosure presents a device, system and method for satisfying all of these demands is to increase the power from the fundamental building blocks of a laser without incurring undue cost increases or sacrificing optical fidelity.

The present disclosure may relate to fiber lasers in a power oscillator configuration. The present disclosure enables a greater than double (>2×) increase in power from the existing fiber laser design (i.e., the prior art).

The present disclosure overcomes some deficiencies of the prior art in one embodiment by using active compensation to correct thermal perturbations caused by an optical fiber. In another embodiment, the present disclosure overcomes some deficiencies of the prior art by refraining from applying mechanical stress or strain to perform any type of compensation (thermal or otherwise) in the optical fiber.

In one aspect, the present disclosure may provide a fiber laser comprising: a Fiber Bragg Grating (FBG); a first thermal controller operatively connected to the FBG; and temperature control logic operatively connected to the first thermal controller adapted to raise or lower the first thermal controller temperature.

In another aspect, the present disclosure may provide a fiber laser comprising: a pump diode powered by a power oscillator; a doped fiber; a legacy Fiber Bragg Grating (FBG) associated with a first output power rating; and a thermal controller, wherein when the thermal controller is connected to the legacy FBG a second output power is established, wherein the second output power is at least 2× greater than the first output power.

In another aspect, the present disclosure may provide a legacy fiber laser system including a pump diode powered by a power oscillator, a doped fiber, a first Fiber Bragg Grating (FBG) having a first output power, wherein the improvement comprises: a thermal controller connected to the first FBG raising the first output power to a second output power at least two times greater than the first output power without increasing input to the power oscillator.

In another aspect, the present disclosure may provide a fiber laser method comprising the steps of: providing an optical fiber defining a fiber core and a first Fiber Bragg Grating (FBG) disposed in the fiber core and a second FBG disposed in the fiber core, wherein the optical fiber is doped intermediate the first and second FBGs; creating a first spectral reflectivity form the first FBG and creating a second spectral reflectivity from the second FBG; reducing spectral walk-off between the first spectral reflectivity and the second spectral reflectivity as power is increased to the optical fiber from a lower first power level to a higher second power level.

In another aspect, the disclosure may provide a fiber laser having a thermal controller operatively connected to one or more fiber Bragg gratings. The thermal controller imparts very little or does not impart much mechanical stress or strain to the optical fiber in which the FBGs reside because such forces can alter the FBG performance. Rather, the thermal controller utilizes a thermally conductive semi-solid or non-Newtonian fluid to submerge/suspend a portion of the optical fiber in which FBG resides. Temperature control logic controls whether a thermoelectric heater and cooler should be directed to increase or decrease its temperature. The thermoelectric heater and cooler imparts or removes thermal energy from the FBG to efficiently control its performance without the application of mechanical stress. The fiber laser having a thermal controller generally is able to increase laser output power greater than two times the amount of output power of a similarly fabricated fiber laser free of the thermal controller(s).

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
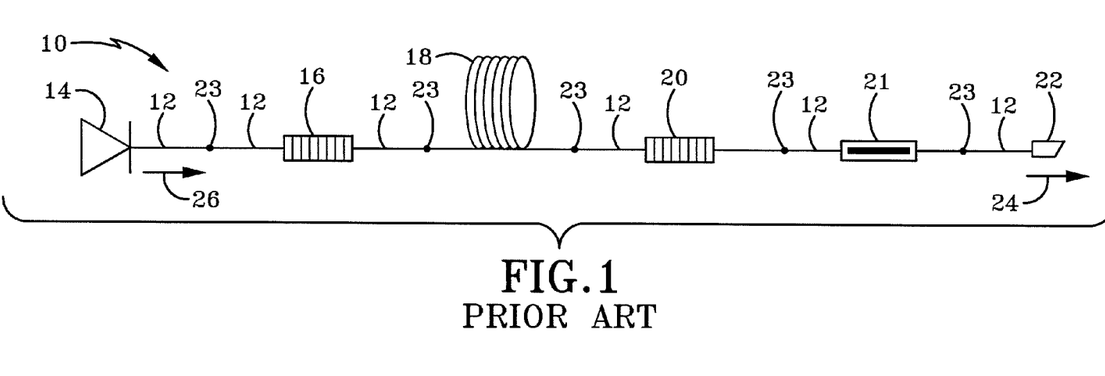
FIG. 1 is a schematic view of a PRIOR ART fiber laser including a high reflective fiber Bragg grating and a partial reflective fiber Bragg grating.
Figure 2:
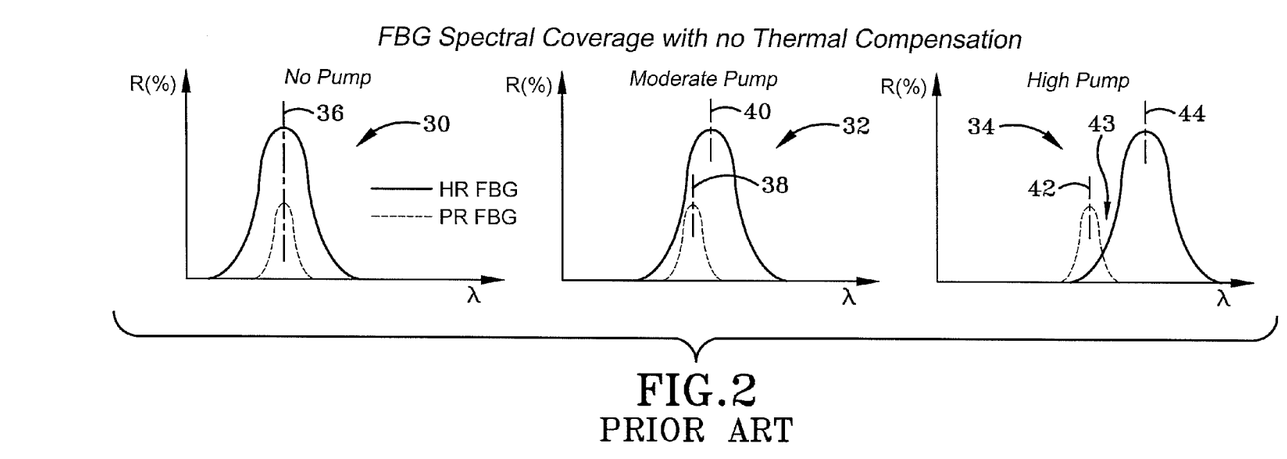
FIG. 2 is a series of diagrammatic graphs depicting a first scenario with no pump, a second scenario with moderate power pumping creating slight walk-off, and a third scenario with high power pumping creating debilitating walk-off when a PR FBG apex does not lay under the HR FBG reflectivity curve.

Reference is now made to FIG. 1 and FIG. 2 which are PRIOR ART and are described herein to provide a more clear understanding of the need for the present disclosure. Some similar components of PRIOR ART fiber lasers are utilized in the present disclosure and those components are identified by similar reference numerals.

FIG. 1 depicts a PRIOR ART power oscillator fiber laser architecture which is generally depicted at 10. Fiber laser 10 includes an optical fiber 12, a pump diode 14, a High Reflector Fiber Bragg Grating (HR FBG) 16, a doped portion of fiber 18, and a Partial Reflector Fiber Bragg Grating (PR FBG) 20. The fiber laser 10 may also include a cladding stripper 21 and terminator 22 are to condition the emitted signal output 24 of the fiber laser to a desired set of requirements. Additionally, splice locations 23 are depicted as unions where elements may be spliced (if necessary) together as one having ordinary skill in the art would understand. Splice locations 23 are non-limiting and in some instances may not be present at all. A power oscillator (not shown) is connected to the pump diode via a standard optic connection.

Fiber laser 10 depicted in FIG. 1 is generally referred to an end-pumped laser because the HR FBG 16 passes and reflects 100% of the pump powered electromagnetic radiation 26 from the pump diode 14 and the PR FBG 20 only passes and reflects the residual pump electromagnetic radiation remnants from the gain medium (here the gain media is the doped portion of fiber 18). The performance and efficiency of the two FBG 16, 20 are dependent on the magnitude of optical radiation passed through them. The optical fiber 12 absorbs a finite amount of radiation which thermally loads the two FBGs 16, 20. The thermally loaded two FBGs 16, 20 result in a fundamental limitation to the power oscillator fiber laser 10.

The total amount of pump powered electromagnetic radiation 26 injected into an end-pump fiber power oscillator is limited by the disproportionate amount of pump radiation that each FBG experiences. This is because the spectral coverage of each FBG will "walk-off" from one another due to uneven heating of the FBGs. The term "walk-off" is defined in greater detail below with reference to FIG. 2.

FIG. 2 depicts three scenarios generally illustrating the spectral coverage of the two FBGs 16, 20 under various level of pumping. In each of these scenarios, the y-axis represents the reflectivity percentage—R (%) of the FBG and the x-axis represents the reflected wavelength (λ) of the each respective FBG. The HR FBG 16 is represented by a parabolic-shaped solid line and the PR FBG 20 is represented by a parabolic-shaped dashed line.

A first scenario is depicted generally at 30. The first scenario 30 is a no pump scenario insofar as the electromagnetic radiation 26 is not pumped through the two FBGs 16, 20. The apex of the HR FBG curve align with the apex of the PR FBG curve. The alignment of the apexes is represented by dot-dash line 36. The direct alignment of the HR FBG apex with the PR FBG apex indicates strong lasing in the laser output 24.

A second scenario is depicted at 32. The second scenario is a low pump scenario insofar as the electromagnetic radiation 26 is pumped through the two FBGs 16, 20 but with a low amount of power. The apex of the HR FBG curve does not directly align with the apex of the PR FBG curve. The PR FBG apex, represented by dot-dash line 38 is still beneath the HR FBG curve. The HR FBG apex, represented by dot-dash line 40, and the PR FBG apex are "walking-off" relative to each other when pump power moves electromagnetic radiation through the optical fiber.

The term "walk-off", "walking-off", "spectral walk-off", or "spectral walking-off" refers to a process involving two parameters that diverge as the process occurs. Particularly, the parameters move away from each other and the spatial displacement of the parameters (i.e., the two curves representing the HR FBG and the PR FBG, respective) in a non-linear parametric process. These terms also refer to the spectral reflectivity of each FBG as the pump power is increased. Since each FBG experiences different levels of pump power and therefore different levels of heating, the spectral reflectivity of the PR FBG and HR FBG change at different rates because the are each heat-dependent. Thus, as the curve apexes move away from each other, "walk-off" or "walking-off is experience. There needs to be sufficient spectral overlap between the PR FBG and HR FBGs in order for lasing to occur, and the most efficient lasing occurs when there is direct alignment of HR FBG and PR FBG curve apexes.

A third scenario is depicted at 34. The third scenario is a high pump scenario insofar as the electromagnetic radiation 26 is pumped through the two FBGs 16, 20 with a high amount of power. The apex of the HR FBG curve does not directly align with the apex of the PR FBG curve. The PR FBG apex 42, represented by a dot-dash line is not beneath the HR FBG curve; stated otherwise PR FBG apex 42 is outside the coverage of the HR FBG curve. The HR FBG apex, represented by dot-dash line 44, and the PR FBG apex are "walking-off" relative to each other at a greater rate when high pump power moves electromagnetic radiation through the optical fiber. The HR FBG heats up considerably more than the PR FBG because all of the pump power passes through it, whereas the PR FBG only experiences the residual pump power emitted from the doped fiber. Thus, as pump power increases, the tendency for the two reflectivity curves to walk-off increases.

In order for the power oscillator to operate as a laser there must be significant spectral overlap of the spectral coverage of each FBG. The disproportionate heating of the HR FBG causes paralyzing/detrimental spectral walk-off between the two FBGs. Once significant walk-off has occurred a cavity 43 defined between the two curves/graphs when overlap decreases identifies that fiber laser 10 becomes unstable and stops lasing.

The PRIOR ART of FIG. 1 and FIG. 2 helps describe the need for reducing "walk-off" in order to increase lasing efficiency when high pumping power moves electromagnetic radiation 26 through optical fiber 12.

Figure 3:
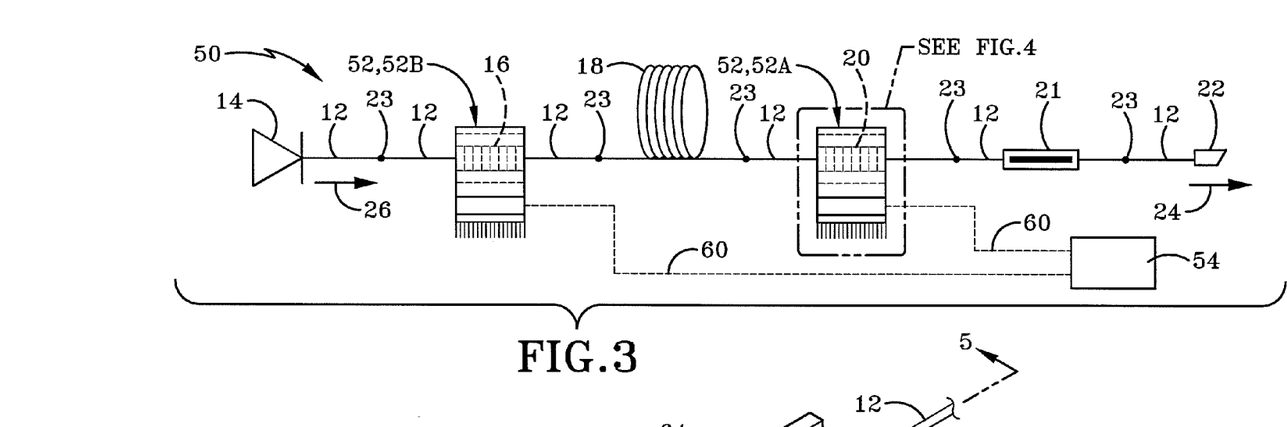
FIG. 3 is a schematic view of a fiber laser according the present disclosure including thermal controllers coupled to the two FBGs.

As depicted in FIG. 3, a fiber laser architecture in accordance with the present disclosure is generally depicted at 50. The present disclosure fiber laser 50 may include optical fiber 12, pump diode 14, a highly reflective first FBG 16, the doped fiber 18, a partially reflective second FBG 20, a cladding stripper 21, and a terminator 22. The terms "first FBG" and "second FBG" are used herein for reference only and are not intended to be limiting. For example, in the Claims presented below the term "first FBG" may sometimes refer to a Partially Reflective FBG and the term "second FBG" may sometime refer to a Highly Reflective FBG depending on the preferred configuration to be claimed.

Fiber laser 50 may also include a thermal controller 52 operatively connected to temperature control logic 54. In one particular embodiment, fiber laser 50 includes a first thermal controller 52A and a second thermal controller 52B.

Optical fiber 12 may be the gain media associated with fiber laser 50. More particularly, doped fiber 18 is a gain medium position between high reflective first FBG 16 and partially reflective second FBG 20. Doped fiber 18, by way of non-limiting example, may be doped with rare earth ions, such as erbium, neodymium, ytterbium, thulium or praseodymium. Optical fiber 12 is operatively coupled with pump diode 14 in order to deliver light or electromagnetic radiation to the optical fiber 12. Thus, fiber laser 50 may generally be considered a diode pump laser.

A laser resonator is defined between first HR FBG 16 and second PR FBG 20 in doped fiber 18. FBGs 16, 20 are a portion of the laser resonator containing a corrugated wave guide structure, such as a grating section, in order to provide wave-length dependent feedback to define the emission wave length of the laser output. Ordinarily, these types of distributed brag reflector lasers are single-frequency lasers with diffraction-limited output. However, it is entirely possible that the present disclosure may be wave-length tunable, such as a tunable laser.

Figure 4:
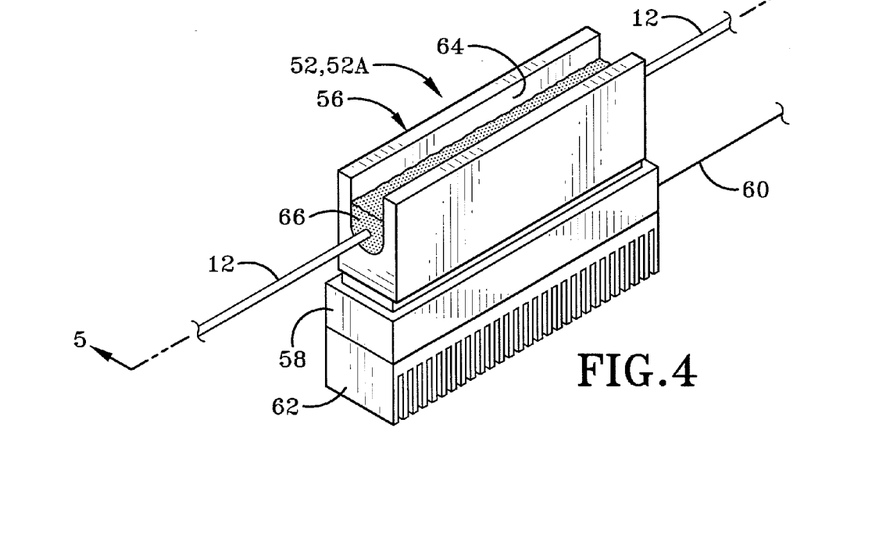
FIG. 4 is a perspective view of a thermal controller suspending a portion of the optical fiber in thermally conductive semi-solid with a thermoelectric cooler and heater forming a portion of the thermal controller.

As depicted in FIG. 4, thermal controller 52 may include a housing 56, a thermal electric cooler and heater 58 connected to control logic 54 via control line 60, and a heat sink 62.

Housing 56 is a generally rectangular-shaped rigid structure defining a U-shaped channel 64 extending longitudinally from a first end of the housing to a second end of the housing. U-shaped channel 64 is filled with a thermally conductive semisolid material 66, such as a gel or a paste. Thermally conductive semisolid material 66, in other alternative embodiments, may be in the form of a thermally conductive non-Newtonian fluid. An exemplary thermally conductive material 66 is manufactured and distributed for sale by Wakefield-Vett, Inc. of Pelham, N.H., and is commercially available for sale under the trade name of the 120 Series Thermal Joint Silicon Compound. Other thermal joint compounds are clearly contemplated provided that the thermal material 66 does not apply mechanical stress or mechanic strain to optical fiber 12.

With continued reference to FIG. 4, optical fiber 12 is suspended within the semisolid thermally conductive material 66 within U-shaped channel 64. Particularly, a portion of optical fiber 12 where the FBG resides is suspended in thermally conductive material 66 within U-shaped channel 64. When optical fiber 12 is submerged in semisolid 66, no mechanical stress is applied to optical fiber 12 and no mechanical strain is applied to optical fiber 12. In accordance with one aspect of the present disclosure, thermal controller 52 enables heat to be applied or removed from the FBG without adding mechanical pressures, strains, or stresses which would affect the performance of the FBG.

Figure 5:
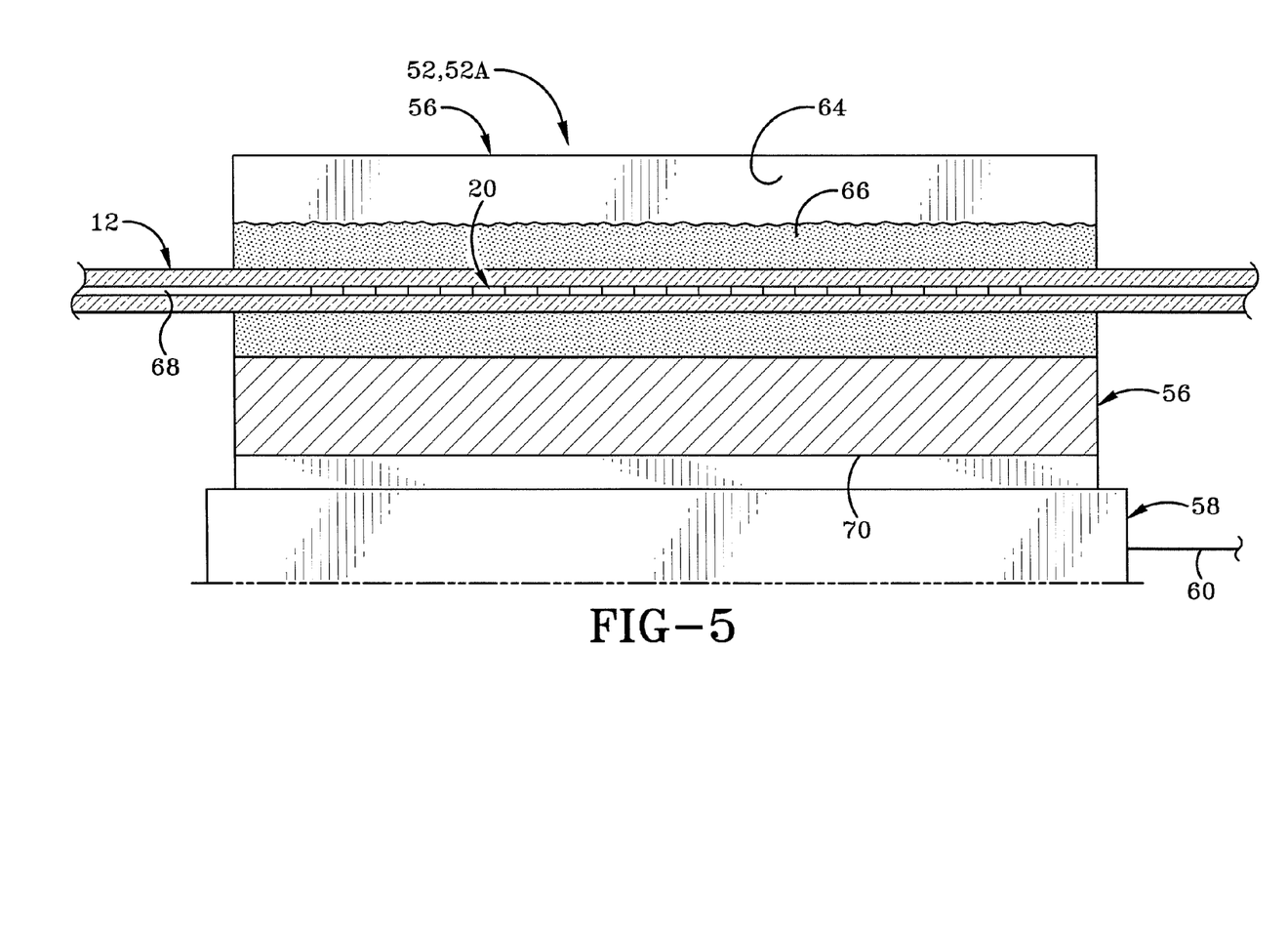
FIG. 5 is a longitudinal cross section taken along line 5-5 in FIG. 4.

As depicted in FIG. 5, the cross-section shows the portion of optical fiber 12 having the second FBG 20 positioned within fiber core 68 generally submerged in thermally conductive material 66. A bottom portion of housing 56 is directly connected to thermal electric cooler and heater 58 along union 70. Housing 56 may be fabricated from a thermally conductive material, and is preferably not an insulator. In some applications, housing 56 may be fabricated from metal and in others, housing 56 may be fabricated from a conductive nonmetal.

Thermal electric cooler and heater 58 uses the Peltier effect to create a heat flux between a junction of two different types of materials. The thermal electric cooler and heater 58 may be a solid state active pump which transfers heat from one side of the device to the other, with consumption of electrical energy from a power source (not shown) and controlled by control line 60. Thermal electric cooler and heater 58 can be used for either heating or cooling. Control line 60 represents either a physical link or a logical link between thermal electric cooler and heater 58 and control logic 54. In some implementations, control line 60 may be a wireless connection thereby defining a logic link to enable the exchange of information between the temperature control logic 54 and thermal electric cooler and heater 58.

Figure 6:
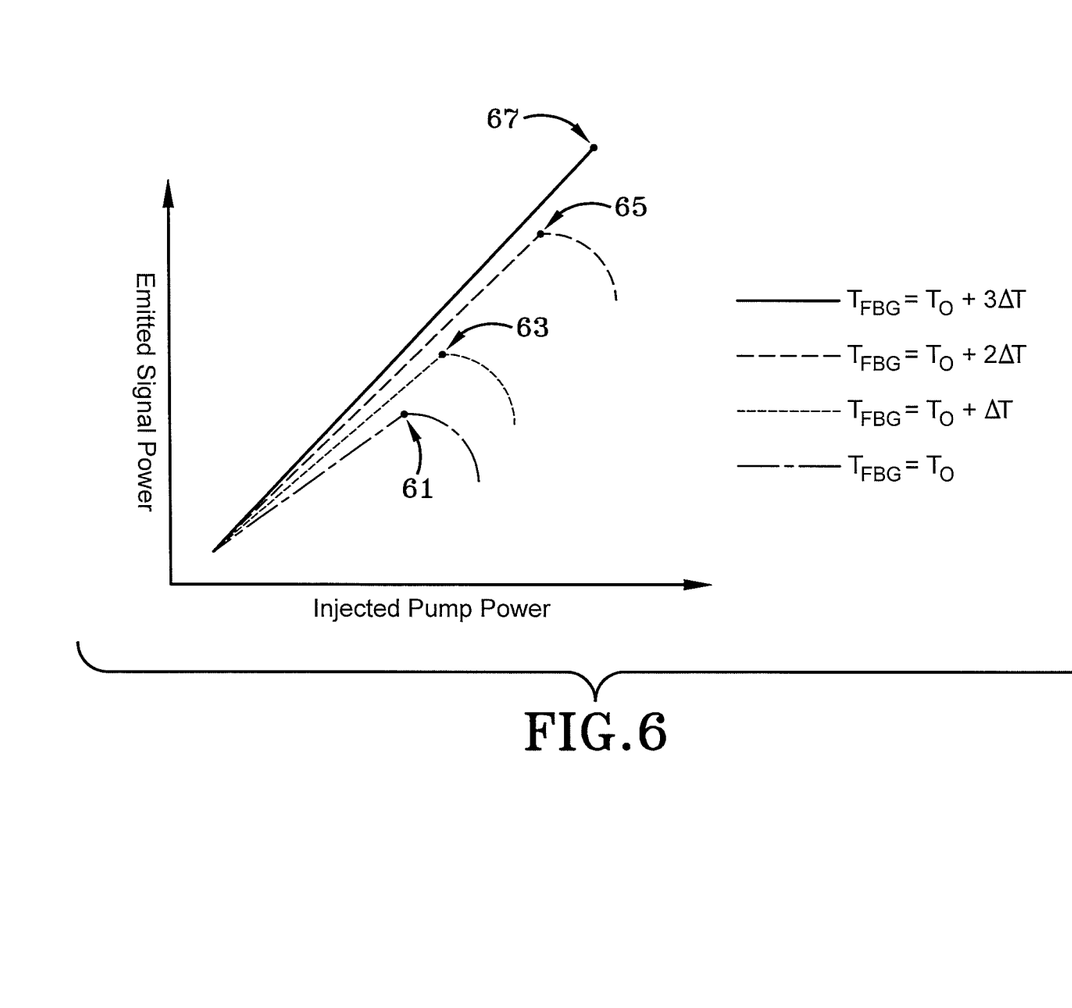
FIG. 6 is a graph depicting the FBG temperature for an injected pump power (x-axis) versus an emitted laser output signal power (y-axis) depending on a temperature change in the thermal controller.

As depicted in FIG. 6, a general graphic representation is provided of a set point FBG temperature ($T_{FBG}$) for injected pump power (x-axis) versus emitted laser output signal power (y-axis) based on the change in temperature ($\Delta T$) of thermal controller 52 relative to a starting temperature ($T_O$) (i.e., ambient temperature and an inactive thermal controller). As depicted by the line representing $T_{FBG}=T_O$, the injected pump power increases approximately linearly to a maximum 61, at which point the signal power starts to decrease even as the injected pump power increases. As depicted by the line representing $T_{FBG}=T_O+\Delta T$, the injected pump power increases approximately linearly to a maximum 63, at which point the signal power starts to decrease even as the injected pump power increases. As depicted by the line representing $T_{FBG}=T_O+2\Delta T$, the injected pump power increases approximately linearly to a maximum 65, at which point the signal power starts to decrease even as the injected pump power increases. As depicted by the line representing $T_{FBG}=T_O+3\Delta T$, the injected pump power increases approximately linearly to a maximum 67, at which point the signal power starts to decrease even as the injected pump power increases. As is clearly shown, one exemplary purpose of fiber laser 50 is to increase the maximum of the curve in order to thereby reduce walk-off.

Figure 7A:
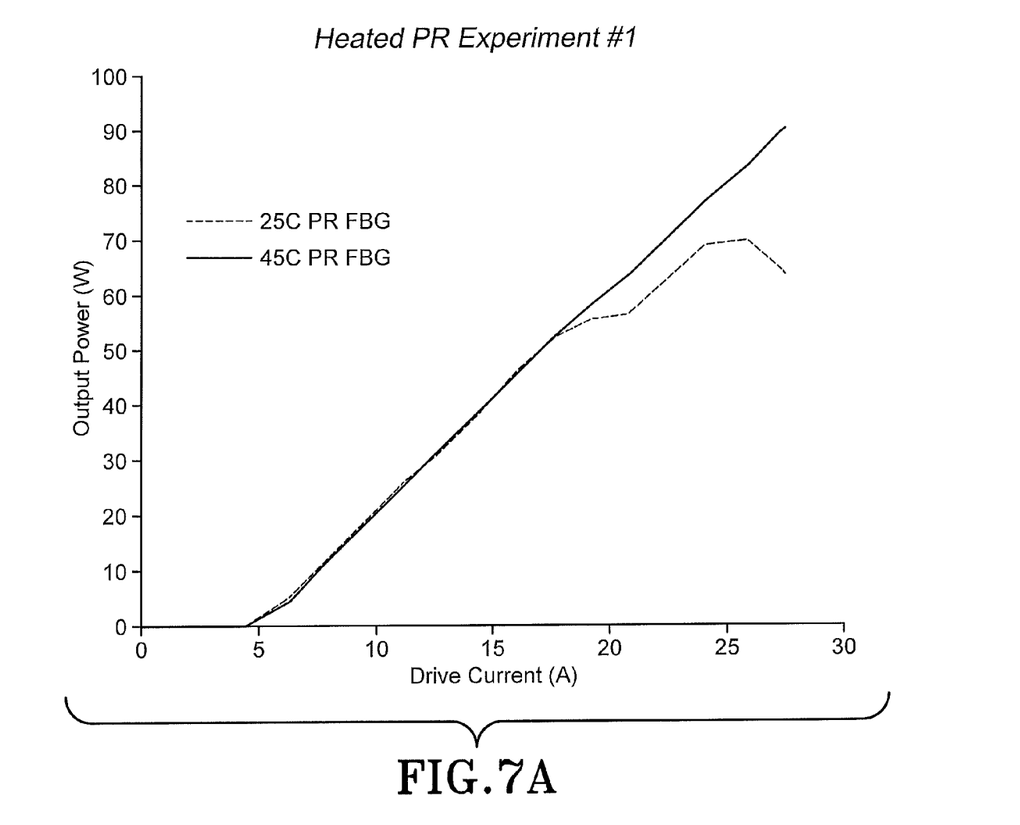
FIG. 7A is comparative representation graph of a first experiment depicting output laser powers (in Watts) versus drive current (in Amps) for one FBG at 25° C. and one FBG at 45° C.

As depicted in FIG. 7A, a line graph is provided depicting a first experiment utilizing a heated partially reflective second FBG 20 as part of fiber laser 50. When FBG 20 temperature is maintained at 25 degrees Celsius (° C.), the laser output power increases until the drive current reaches about 25 Amps. At which point, the maximum laser power of the second FBG 20 at 25° C. is about 70 Watts. After the drive current is increased beyond 25 Amps, laser power decreases and at around 30 Amps, the laser power is approximately 25 Watts.

With continued reference to FIG. 7A, a first experiment revealed test results confirming that a heated partially reflective second FBG 20 temperature at 45° C. maintains laser power increasingly as drive current increases. Particularly at 25 Amps, the laser power of the FBG 20 temperature at 45° C. is about 75 Watts. As the drive current is increased from 25 Amps to 30 Amps, the laser power in the FBG 20 at 45° C. increases to about 90 Watts. Thus, the first experiment showed as the raised temperature of the FBG 20 maintained an approximately linear increase of laser power associated with the increasing drive current. Whereas the FBG 20 at approximate room temperature (25° C.) drops off and loses laser power at 25 Amps.

Figure 7B:
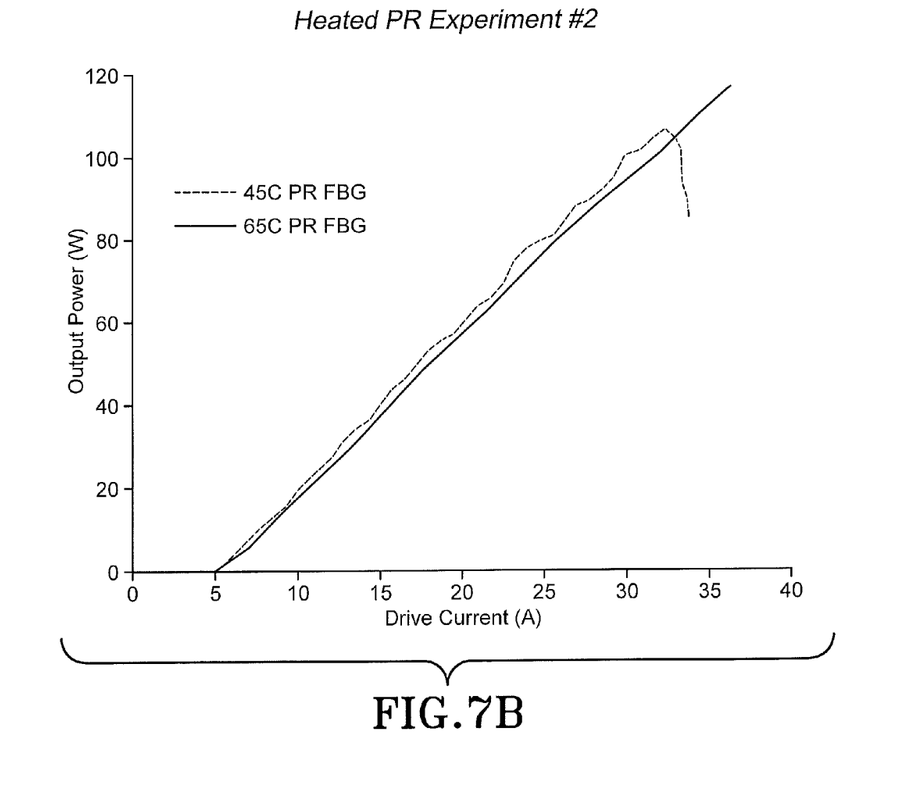
FIG. 7B is comparative representation graph of a second experiment depicting output laser powers (in Watts) versus drive current (in Amps) for one FBG at 55° C. and one FBG at 65° C.

As depicted in FIG. 7B, a second experiment compares the laser power output in watts relative to the input pumping drive current applied from the pump diode 14. In the second experiment, the second FBG 20 temperature is maintained at 45° C. and has an approximately linear increasing relationship of drive current to output laser power. At about 30 Amps, the laser power of the 45° C. FBG 20 is approximately 100 Watts. However, as the drive current increases from 30 Amps to 35 Amps, the output laser power begins to decrease and the experiments revealed that at 35 Amps, the laser output power of the FBG 20 temperature at 45° C. decreases down to approximately 80 Watts.

The second experiment (FIG. 7B) further revealed that an increase in FBG 20 temperature from 45° C. to 65° C. maintained the linear relationship as a drive current is increased. The FBG 20 maintained at a temperature of approximately 65° C. has a laser output power of approximately 115 Watts at a drive current of about 35 Amps. When the drive current is increased from 35 Amps to 40 Amps, laser output power also increases to approximately 125 Watts. Thus, the second experiment confirmed that the heating of the partially reflective second FBG 20 enables the drive current to be increased while producing a greater output laser power.

Figure 8:
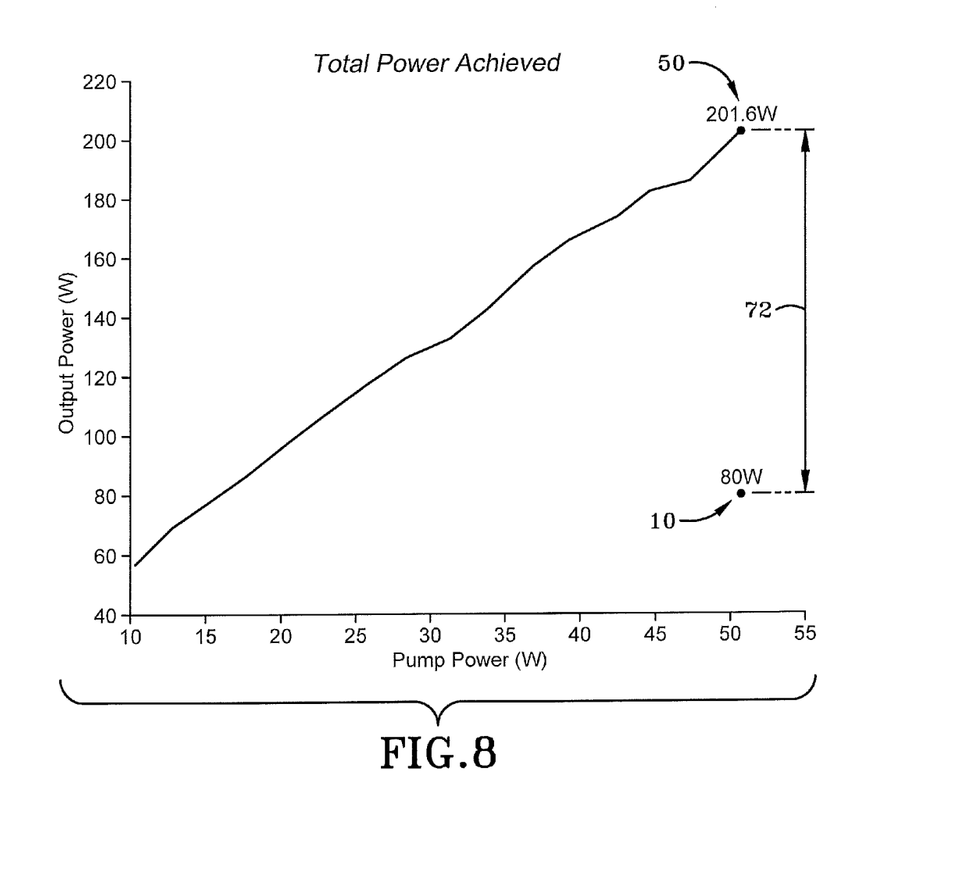
FIG. 8 is a line graph depicting the total laser power (Y-axis) of the present disclosure being twice as powerful as the prior art having the same input pump power (X-axis).

As depicted in FIG. 8, a graph shows the total power achieved by the fiber laser 50 architecture of the present disclosure. In this graph, the output power of the laser is represented in watts on the Y-axis and the pump power is represented in watts on the X-axis. As the pump power is driven to its maximum of 50 Watts (x-axis), the fiber laser 50 having thermal controller 52 increases the laser output power to over 200 Watts, and more particularly 201.6 Watts (y-axis). The prior art fiber laser 10 only produced a laser output power of 80 watts (y-axis) when the pump power was driven to its maximum of 50 Watts (x-axis). The difference between the maximums is represented by line 72 in FIG. 8. As shown by line 72, fiber laser 50 is able to achieve a laser output power greater than two times the laser output power of prior art fiber laser 10 (which was 80 watts).

Figure 9:
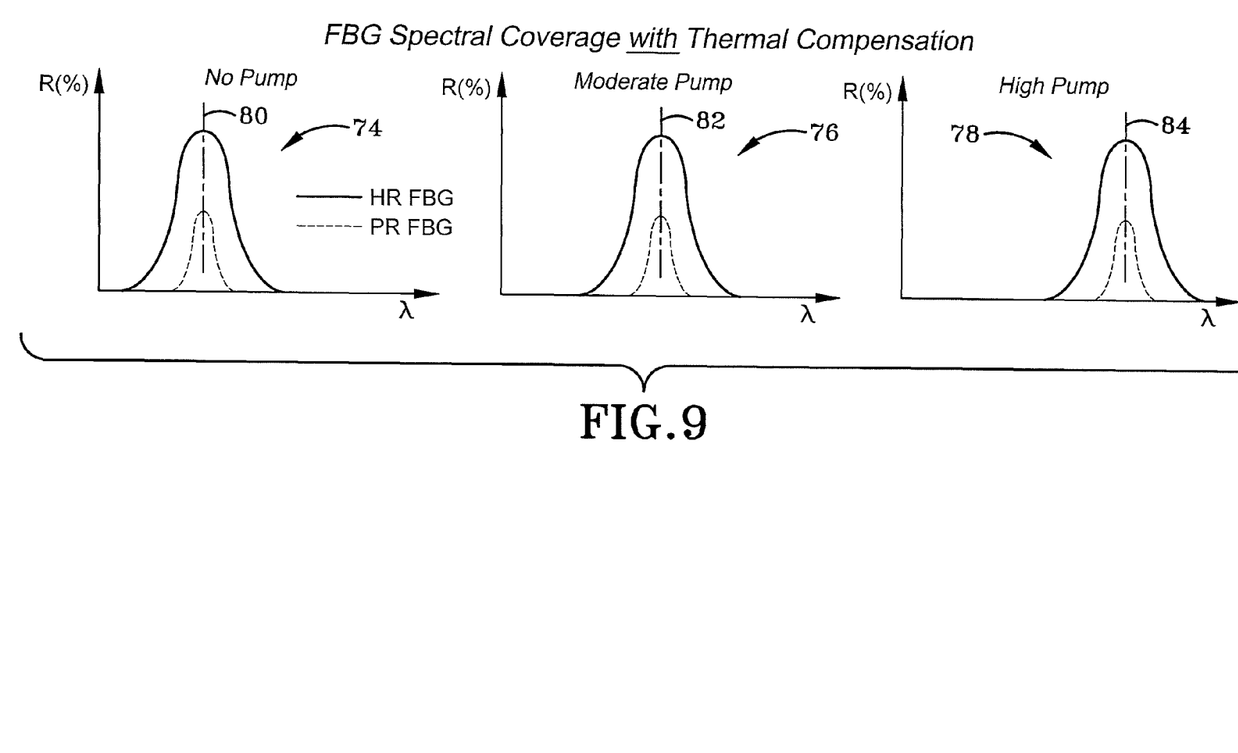
FIG. 9 is a series of diagrammatic graphs incorporating the fiber laser of FIG. 3 depicting a first scenario with no pump, a second scenario with moderate power pumping and no walk-off, and a third scenario with no walk-off.

FIG. 9 depicts a series of graphs of FBG spectral coverage with thermal compensation in accordance with fiber laser 50 having thermal controller 52. A first scenario 74 depicts a no pump situation similar to the first scenario 30 in FIG. 2. In this instance, there is no walk off between the apexes of the HR FBG 16 and the PR FBG 20. The direct alignment of the apexes of HR FBG 16 and PR FBG 20 are indicated by dot dash line 80.

A second scenario 76 is depicted with a moderate amount of pump power applied to the fiber laser 50 having thermal compensation controlled by logic 54. The second scenario 76 depicts that walk off is reduced as the fiber gratings are thermally compensated. In the instance of the second scenario 76, the apexes of the HR FBG 16 and the PR FBG 20 are still aligned under moderate pump power which is represented by dot dash line 82 indicating that walk off has been reduced when the FBG's 16, 20 are thermally compensated. A third scenario 78 represents that even with high pump power inserted into fiber laser 50, walk off is still reduced. As indicated in the third scenario 78, a dot dash line 84 depicts the aligned apexes of HR FBG 16 and PR FBG 20. The depiction of PR FBG 20 entirely beneath the curve of HR FBG 16 in the third scenario 78 proves that efficient lasing still occurs even with high pump power when the FBG's are thermally compensated in accordance with the structure depicted above with respect to fiber laser 50.

In accordance with an aspect of the present disclosure, the fiber laser 50 architecture including one or more thermal controllers 52 enables a laser/lasing system to more efficiently produce output power without having to increase input pump power.

Fiber laser 50 architecture may be manufactured as a system, or fiber laser 50 may be fabricated by retrofitting an existing legacy fiber laser system. In the first instance, when fiber laser 50 is fabricated from scratch, the manufacture may rigidly secure thermal controller to a frame. Then, the manufacturer may dispose optical fiber 12 into channel 64 and then fill channel 64 with thermally conductive semi-solid material 66 to thereby submerge the portion of the optical fiber in the channel. The submerged portion of the optical fiber houses one of the FBGs in the fiber core 68. The remaining portions of the fiber laser may be assembled in a conventionally known manner utilizing splicing techniques at splice locations 23.

If fiber laser 50 architecture is created by retrofitting an existing legacy fiber laser system, a manufacturer must disconnect the portion of optical fiber where one of the FBGs resides from its frame or supporting structure. This allows one or more thermal controllers to be added to the system. Then, in a similar assembly to that described above, the retrofitting manufacturer submerges the FBG section of optical fiber in a thermal gel/paste (i.e., thermal semi-solid material 66) within channel 64.

In each instance, once the FBG has been disposed in the channel 66, the thermoelectric cooler and heater 58 may be operatively coupled to temperature control logic 54 via line link 60. "Logic", as used herein, includes but is not limited to hardware, firmware, software and/or combinations of each to perform a function(s) or an action(s), and/or to cause a function or action from another logic, method, and/or system. For example, based on the needs of fiber laser 50, the temperature control logic 54 may include a software controlled microprocessor, discrete logic like a processor (e.g., microprocessor), an application specific integrated circuit (ASIC), a programmed logic device, a memory device containing instructions, an electric device having a memory, or the like to thereby cause the temperature of cooler and heater 58 to increase and decrease, respectively. Temperature control logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

In operation, fiber laser 50 reduces spectral walk-off between a first spectral reflectivity associated with one FBG and a second spectral reflectivity associated with another FBG as power is increased to the optical fiber 12 from a lower first power level to a higher second power level.

Pump diode 14 will input electromagnetic radiation 26 along optical fiber 12. Based on the assembly of first HR FBG 16 positioned "upstream" from the doped fiber 18, all of the electromagnetic radiation 26 passes through HR FBG 16. This causes HR FBG 16 to increase in temperature.

A sensor, such as a thermometer (not shown) recognizes that the HR FBG 16 increases from a lower first temperature to a higher second temperature. However, as explained above, when the HR FBG 16 increases in temperature, there is a tendency for "walk-off" off to occur. (See FIG. 2; third scenario 34).

To reduce the likelihood of walk-off between the two spectral reflectivity curves (e.g., one reflectivity curve associated with HR FBG 16, and another reflectivity curve associated with PR FBG 20), temperature control logic 54 may send control signals to thermal controller 52B via link 60 to thermoelectric cooler and heater 58 to decreases its temperature. The cooling effect of thermoelectric cooler and heater 58 lowering its temperature from a higher first temperature to a second lower temperature imparts heat loss from optical fiber 12 through thermal gel material 66, through housing 56, and eventually out to heat sink 62.

Based on the assembly of first PR FBG 20 positioned "downstream" from the doped fiber 18, only the electromagnetic radiation 26 coming from the doped fiber 18 passes through PR FBG 20. This causes PR FBG 20 to have a lower temperature than the temperature of HR FBG 16 at a given time.

A sensor, such as a thermometer (not shown) recognizes that the PR FBG 20 has a lower first temperature than the temperature of HR FBG 16 at a given time. In order to reduce walk-off the temperature of the PR FBG 20 may be increased from a lower first temperature to a higher second temperature. Temperature control logic 54 may send control signals to thermal controller 52 via link 60 to thermoelectric cooler and heater 58 to increase its temperature. The heating effect of thermoelectric cooler and heater 58 increasing its temperature from a lower first temperature to a higher second temperature imparts heat to housing 56, to thermal gel material 66 and eventually to the FBG positioned in the fiber core 68 of optical fiber 12.

Temperature control logic 54 independently controls first thermal controller 52A and second thermal controller 52B. Temperature control logic 54 is programmed in accordance with FIG. 9 to ensure that the temperature of FBG 16 and FBG 20 are controlled in a way that apexes of their respective spectral reflectivity curves stay aligned in both the moderate pump scenario 76 and the high pump scenario 78. Thus, there may be some instance where temperature control logic 54 only lowers the temperature of thermal controller 52B to lower the temperature of HR FBG 16 or wherein temperature control logic only increases the temperature of thermal controller 52A to raise the temperature of PR FBG 20. Yet, there may be other instance where temperature control logic simultaneously lowers the temperature of thermal controller 52B to lower the temperature of HR FBG 16 and increases the temperature of thermal controller 52A to raise the temperature of PR FBG 20.

Additionally, while the present disclosure is depicted herein as generally referred to as a distributed Bragg reflector laser (DBR laser) with two FBGs, the use of the thermal controllers may be incorporated into distributed feedback lasers with a single grating in doped fiber, with a phase shift in the middle.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:

1. A fiber laser comprising:
   a Fiber Bragg Grating (FBG);
   a first thermal controller operatively connected to the FBG;
   a temperature control logic operatively connected to the first thermal controller adapted to raise or lower the FBG temperature through the first thermal controller;
   a lower first laser output power resulting when the temperature control logic is inactive; and
   a higher second laser output power resulting when the temperature control logic is activated;
   wherein the higher second laser output power at least two times greater than the lower first output power without any increase of an input power to a pump diode.

2. The fiber laser of claim 1, further comprising:
   an optical fiber defining a fiber core and the FBG disposed within the fiber core; and
   wherein the first thermal controller includes a thermally conductive semi-solid material surrounding a portion the optical fiber where the FBG is disposed.

3. The fiber laser of claim 2, wherein the first thermal controller further includes:
   a thermally conductive housing defining a channel, and the optical fiber surrounded by the semi-solid material is disposed within the channel; and
   a thermoelectric cooler (TEC) and heater adjoining the thermally conductive housing configured to selectively heat and cool the housing to affect thermal energy coupled to the FBG.

4. The fiber laser of claim 1, further comprising:
   a doped portion of optical fiber intermediate the FBG and the pump diode;
   wherein the FBG is a partially reflective FBG, and wherein the first thermal controller is a heater configured to raise the first FBG temperature.

5. The fiber laser of claim 4, wherein the first thermal controller applies no mechanical stress to the FBG.

6. The fiber laser of claim 4, wherein the first thermal controller applies no mechanical strain to the FBG.

7. The fiber laser of claim 4, further comprising:
   a highly reflective FBG intermediate the pump diode and the doped portion of optical fiber;
   a laser resonator defined by the partially reflective FBG, the doped portion of optical fiber and the highly reflective FBG; and
   a second thermal controller operatively connected to the highly reflective FBG, wherein the temperature control logic is operatively connected to the second thermal controller adapted to raise or lower the highly reflective FBG temperature through the second thermal controller.

8. The fiber laser of claim 7, wherein the second thermal controller is a cooling device configured to decrease the highly reflective FBG temperature.

9. The fiber laser of claim 8, wherein the second thermal controller applies no mechanical stress and no mechanical strain to the highly reflective FBG.

10. The fiber laser of claim 1, wherein the laser output power is at least two times greater than that of a similar fiber laser free of a thermal controller.

11. A fiber laser method comprising the steps of:
    providing an optical fiber defining a fiber core;
    providing a first Fiber Bragg Grating (FBG) disposed in the fiber core; and
    providing a second FBG disposed in the fiber core,
    wherein the optical fiber is doped intermediate the first and second FBGs, a first thermal controller is operatively connected to the first FBG and a second thermal controller is operatively connected to the second FBG;
    creating a first spectral reflectivity from the first FBG and creating a second spectral reflectivity from the second FBG;
    comparing the first spectral reflectivity with the second spectral reflectivity;
    defining a spectral walk-off as a difference in a rate of change in the first spectral reflectivity and a rate of change in the second spectral reflectivity as an input power is increased;
    reducing the spectral walk-off between the first spectral reflectivity and the second spectral reflectivity as the input power is increasingly pumped to the optical fiber from a lower first input power level to a higher second input power level.

12. The method of claim 11, wherein the step of reducing spectral walk-off is accomplished by:
    modifying the first FBG temperature as electromagnetic radiation moves along the optical fiber with the first thermal controller.

13. The method of claim 12, wherein the step of modifying the temperature of the first FBG is accomplished by:
    increasing the temperature of a thermoelectric heater operatively connected to a portion of the optical fiber where the first FBG is disposed.

14. The method of claim 12, wherein the step of modifying the temperature of the first FBG is accomplished by:
    decreasing the temperature of a thermoelectric cooler operatively connected to a portion of the optical fiber where the first FBG is disposed.

15. The method of claim 12, wherein the step of reducing spectral walk-off is further accomplished by:
    modifying the second FBG temperature as electromagnetic radiation moves along the optical fiber with the second thermal controller, wherein modifying the second FBG temperature occurs independently from modifying the first FBG temperature.

16. The method of claim 15, wherein the step of reducing spectral walk-off is further accomplished by:
    refraining from applying any mechanical stress or strain to the first and second FBGs as their respective temperatures are modified.

17. The method of claim 11, wherein the step of reducing spectral walk-off is accomplished by:
    suspending a portion of the optical fiber where the first FBG is disposed in one of the following thermally conductive materials: (i) a semi-solid, and (ii) a non-Newtonian fluid;
    coupling the thermally conductive material with temperature control logic; and
    regulating the thermally conductive material temperature based, at least in part, on an amount of electromagnetic radiation moving along the optical fiber.

18. The method of claim 11, wherein the step of reducing spectral walk-off is accomplished by:

maintaining an overlap in spectral reflectivity curves respectively associated with the first FBG and the second FBG.

19. The method of claim 11, wherein subsequent to the step of reducing spectral walk-off is includes the steps of:
- establishing a first laser output power at the higher second input power;
- activating at least one of the first and second thermal controllers;
- establishing a second laser output power at the higher second input power when at least one of the first and second thermal controller is activated,
- wherein the first laser output power is at least two times greater than the first output power at the same higher second input power.

* * * * *